United States Patent
Shahidi

(10) Patent No.: US 8,036,242 B2
(45) Date of Patent: Oct. 11, 2011

(54) DYNAMIC CAPACITY OPERATING POINT MANAGEMENT FOR A VOCODER IN AN ACCESS TERMINAL

(75) Inventor: Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1583 days.

(21) Appl. No.: 11/355,398

(22) Filed: Feb. 15, 2006

(65) Prior Publication Data

US 2007/0192090 A1    Aug. 16, 2007

(51) Int. Cl.
    *H04J 3/16* (2006.01)
(52) U.S. Cl. ..................................... 370/465
(58) Field of Classification Search ................ None
    See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,414,796 A | 5/1995 | Jacobs et al. | |
| 5,659,569 A | 8/1997 | Padovani et al. | |
| 5,703,902 A * | 12/1997 | Ziv et al. | 370/252 |
| 5,857,147 A | 1/1999 | Gardner et al. | |
| 7,286,558 B2 * | 10/2007 | Kim et al. | 370/465 |
| 7,463,901 B2 * | 12/2008 | Svedberg et al. | 370/467 |
| 2002/0097697 A1 * | 7/2002 | Bae et al. | 370/335 |
| 2002/0155853 A1 * | 10/2002 | Lee et al. | 455/522 |
| 2003/0193971 A1 | 10/2003 | Baggen et al. | |
| 2004/0141551 A1 | 7/2004 | Forbes et al. | |
| 2004/0213182 A1 * | 10/2004 | Huh et al. | 370/332 |
| 2006/0028976 A1 | 2/2006 | Park et al. | |

FOREIGN PATENT DOCUMENTS

| | | |
|---|---|---|
| EP | 1213869 A1 | 6/2002 |
| JP | 8505511 T | 6/1996 |
| JP | 10336148 A | 12/1998 |
| JP | 2002516520 T | 6/2002 |
| JP | 2004048156 A | 2/2004 |
| JP | 2004350078 A | 12/2004 |
| JP | 2005198118 A | 7/2005 |
| JP | 2006524018 T | 10/2006 |
| KR | 20040065860 | 7/2004 |
| WO | 0203601 | 1/2002 |
| WO | 0230098 | 4/2002 |
| WO | WO2004082228 | 9/2004 |

OTHER PUBLICATIONS

"Enhanced Variable Rate Codec, Speech Service Option 3 and 68 for Wideband Spread Spectrum Digital Systems," 3rd Generation Partnership Project 2 "3GPP2," 3GPP2 C.P0014-B, Version 0.5, Dec. 2005.

International Search Report and Written Opinion—PCT/US2007/062161, International Search Authority—European Patent Office—May 21, 2007.

Taiwanese Search report—096105760—TIPO—May 27, 2010.

* cited by examiner

*Primary Examiner* — Anh-Vu Ly
(74) *Attorney, Agent, or Firm* — Heejong Yoo

(57) ABSTRACT

A variable rate vocoder is configured to encode speech signals with a plurality of encoding rates and to change from a first encoding rate to a second encoding rate according to a received signal indicating reverse link load.

22 Claims, 4 Drawing Sheets

DYNAMIC CAPACITY OPERATING POINT MANAGEMENT FOR A VOCODER IN AN ACCESS TERMINAL

TECHNICAL FIELD

The present application relates to voice encoding, and more particularly, to dynamic capacity operating point management for a vocoder in an access terminal.

BACKGROUND

Mobile phones communicate wirelessly with base stations in a communication system. Mobile phones have voice encoders (vocoders) to encode speech signals into speech data.

SUMMARY

One aspect relates to an apparatus comprising a variable rate vocoder configured to encode speech signals with a plurality of encoding rates. The variable rate vocoder is configured to change from a first encoding rate to a second encoding rate according to a received signal indicating reverse link load.

Another aspect relates to a method comprising receiving a signal indicating reverse link load, processing the signal, and based on the processed signal, changing a speech signal encoding rate from a first encoding rate to a second encoding rate.

The accompanying drawings and description below set forth further details of one or more embodiments.

DETAILED DESCRIPTION

Figure 1:
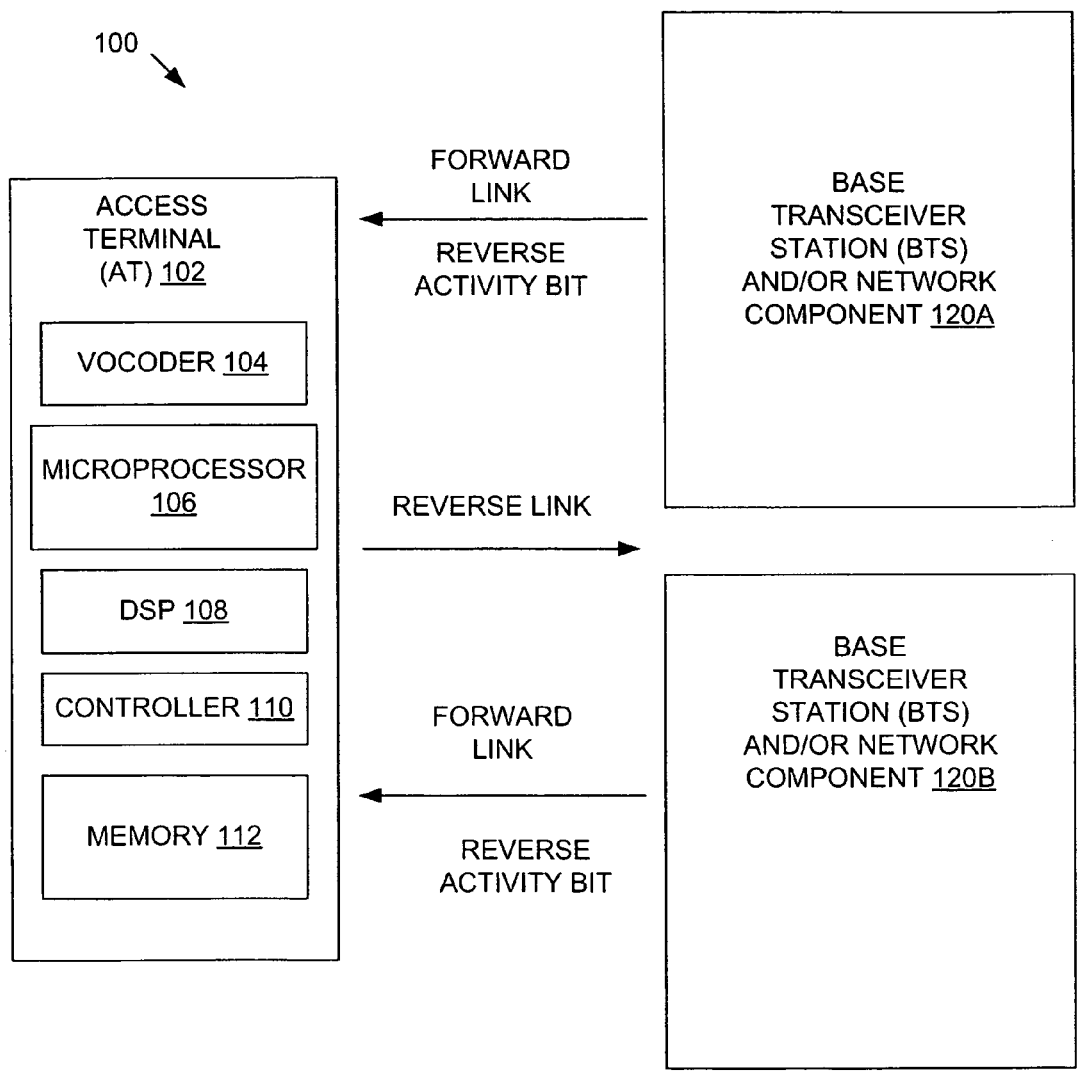
FIG. 1 illustrates a communication system with at least one access terminal and at least two base transceiver stations.

FIG. 1 illustrates a communication system 100 with at least one access terminal (AT) 102 and two base transceiver stations (BTS) (or base station transceiver subsystem) and/or network components 120A, 120B. The access terminal 102 may be mobile or stationary. The access terminal 102 may be connected to or implemented in a computing device, such as a laptop computer. Alternatively, the access terminal 102 may be a self-contained device, such as a mobile phone or personal digital assistant (PDA). For example, the access terminal 102 may be a wired phone, a wireless phone, a cellular phone, a wireless communication personal computer (PC) card, an external or internal modem, etc. The access terminal 102 may be any device that provides communication to a user. The access terminal 102 may have various names, such as mobile station, access unit, subscriber unit, mobile device, mobile terminal, mobile unit, mobile phone, mobile, remote station, remote terminal, remote unit, user device, user equipment, handheld device, etc.

The access terminal 102 may comprise a vocoder 104, a microprocessor 106, a digital signal processor (DSP) 108, a controller 110 and a memory 112. The methods described herein may be implemented by one or more of the components shown in FIGS. 1 and 2. Other components may be implemented in the access terminal 102 instead of or in addition to the components shown in FIG. 1.

The base transceiver station 120 may be referred to as a base station (BS) or an access point (AP). The base transceiver station 120 in FIG. 1 may be part of a communication network, which may also include at least one base station controller (BSC) or a radio network controller (RNC). Other communication networks may include a mobile switching center (MSC) or a packet data serving node (PDSN). The method described below may be implemented in a circuit switched network or a packet switched network.

Figure 2:
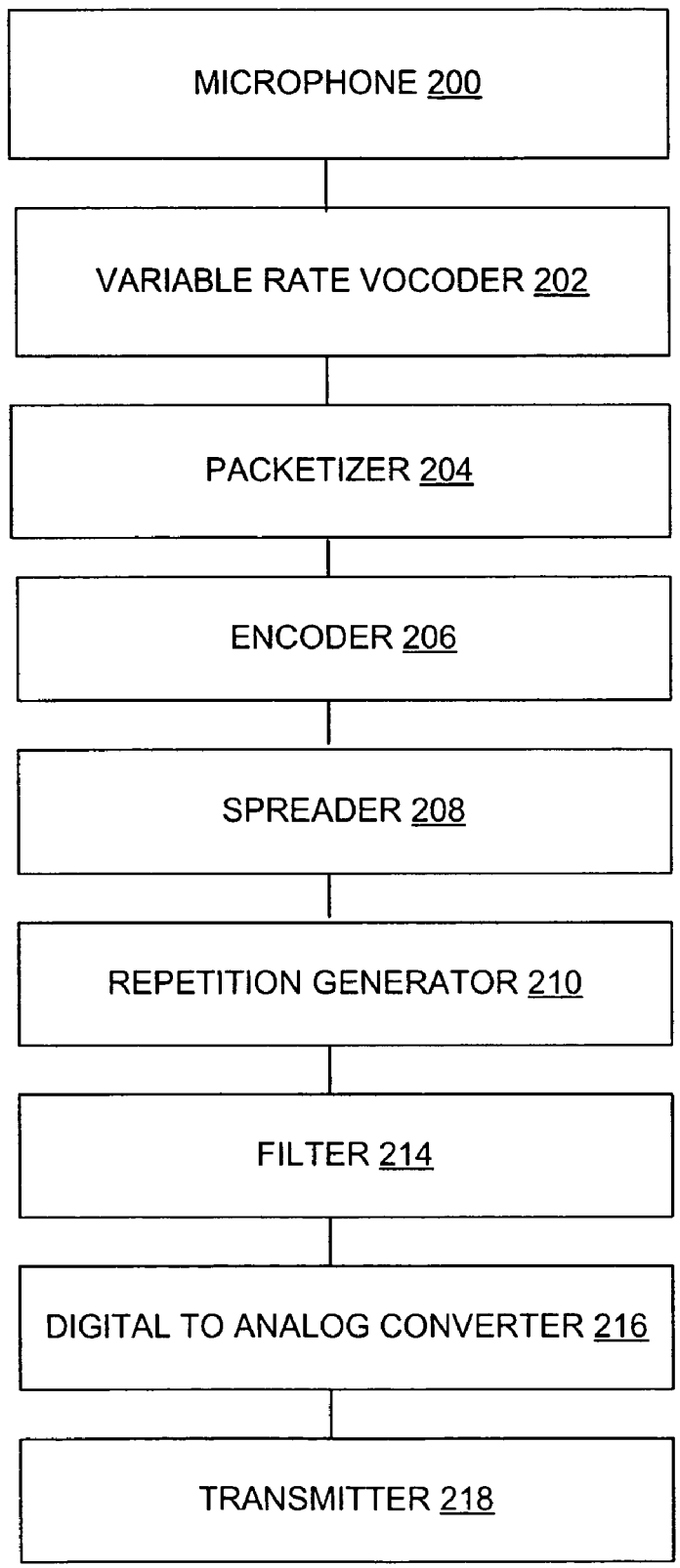
FIG. 2 illustrates some components that may be included in the access terminal of FIG. 1.

FIG. 2 illustrates some components that may be included in the access terminal 102 of FIG. 1. The components in FIG. 2 may enable variable rate, code division multiple access (CDMA) transmission, as described in the Telecommunications Industry Association over-the-air interface standard TIA/EIA Interim Standard 95, and its derivatives, such as, e.g., IS-95B (hereinafter referred to collectively as IS-95). Other components may be implemented in the access terminal 102 instead of or in addition to the components shown in FIG. 2.

A microphone 200 in FIG. 2 detects a speech signal, which is sampled and digitized by an analog-to-digital converter (ADC). A variable rate vocoder 202 encodes the digitized samples of speech with variable rates to provide packets of encoded speech data with equal frame lengths. For example, the variable rate vocoder 202 may convert the digitized samples of input speech to digitized speech parameters that represent the input voice signal using Linear Predictive Coding (LPC) techniques. In one embodiment, the variable rate vocoder 202 is based on a vocoder described in U.S. Pat. No. 5,414,796, which is assigned to the assignee of the present application and is incorporated by reference herein.

The variable rate vocoder 202 may provide variable rate packets of data at four possible packet rates 9600 bits per second (bps), 4800 bps, 2400 bps, and 1200 bps, which are referred to as full, half, quarter, and eighth rates. Packets encoded at full rate may contain 172 information bits. Packets encoded at half rate may contain 80 information bits. Packets encoded at quarter rate may contain 40 information bits, and packets encoded at eighth rate may contain 16 information bits. The packets, regardless of size, may all be one frame length in duration, i.e. 20 milliseconds.

Packets are encoded and transmitted at different rates to compress the data contained therein, which may be based in part on the complexity or amount of information represented by the frame. For example, if the input voice signal includes little or no variation, perhaps because the speaker is not speaking, information bits of the corresponding packet may be compressed and encoded at eighth rate. This compression results in a loss of resolution of the corresponding portion of the voice signal. But since the corresponding portion of the voice signal contains little or no information, the reduction in signal resolution is not typically noticeable. Alternatively, if the corresponding input voice signal of the packet includes significant information, perhaps because the speaker is actively vocalizing, the packet may be encoded at full rate, and the compression of the input speech is reduced to achieve better voice quality.

Compression and encoding are used to limit an average amount of information being transmitted at any one time by a plurality of access terminals, which allows overall bandwidth of a transmission system to be utilized more effectively. This allows, for example, a greater number of telephone calls to be processed at any one time.

The variable rate packets generated by the vocoder 202 are provided to a packetizer 204, which may selectively append cyclic redundancy check (CRC) bits and tail bits to the packets. The variable rate packets from the packetizer 204 are then provided to an encoder 206, which encodes the bits of the variable rate packets for error detection and correction at a receiver. In one embodiment, the encoder 206 is a rate ⅓ convolutional encoder. The convolutionally encoded symbols are then provided to a CDMA spreader 208, such as a spreader described in U.S. Pat. Nos. 5,103,459 and 4,901,307. CDMA spreader 208 maps encoded symbols to a Walsh symbol and then spreads the Walsh symbols in accordance with a pseudo-random noise (PN) code.

A repetition generator 210 receives the spread packets. For packets of less than full rate, the repetition generator 210 generates duplicates of the symbols in the packets to provide packets of a constant data rate.

The repetition generator 210 may provide the aforementioned redundancy by dividing the spread data packet into smaller sub-packets.

The packets are provided to a finite impulse response (FIR) filter 214, such as a filter described in U.S. Pat. No. 5,659,569, and assigned to the assignee of the present application. The filtered signal is then provided to a digital-to-analog converter (DAC) 216 and converted to an analog signal. The analog signal is then provided to a transmitter 218, which up-converts and amplifies the signal for transmission through one or more antennas.

An IS-733 (Qcelp13k) vocoder provides different operating points to trade off system capacity for speech quality. In some communication systems, an algorithm in a radio access network (RAN) may control operating points, i.e., encoding rates, of variable rate vocoders in one or more access terminals. In these systems, a base transceiver station (BTS) measures a reverse link load and reports the load to a BSC. The BSC may then send a layer 3 message to change operating points at an AT based on the reverse link system load.

A 4th Generation (4G) Code Division Multiple Access (CDMA) vocoder (4GV) (also called Enhanced Variable Rate Codec (EVRC)) in an access terminal may allow 8 discrete capacity operating points (COPs) to be configured to trade off speech quality for system capacity. An example of 8 operating points is described in 3GPP2 document C10-20051205-107_C.P0014-B version 0.5, entitled "Enhanced Variable Rate Codec, Speech Service Option 3 and 68 for Wideband Spread Spectrum Digital Systems":

| RATE_REDUC (binary) | encoder operating point | Estimated average encoding rate for active speech (channel encoding rates) | Estimated average encoding rate for active speech (source encoding rates) |
|---|---|---|---|
| '000' | 0 | 9.3 | 8.3 kbps |
| '001' | 1 | 8.5 | 7.57 kbps |
| '010' | 2 | 7.5 | 6.64 kbps |
| '011' | 3 | 7.0 | 6.18 kbps |
| '100' | 4 | 6.6 | 5.82 kbps |
| '101' | 5 | 6.2 | 5.45 kbps |
| '110' | 6 | 5.8 | 5.08 kbps |
| '111' | 7 (½ rate max) | 4.8 | 4.0 kbps |

The Service Option 68 operations when RATE_REDUC = '000' and RATE_REDUC = '111' do not use quarter-rates. These could be used in IS-95 systems where quarter-rate frames are sometimes disallowed.

The disclosure below describes a method to select or switch a COP based on reverse link load. The method may be used in an access terminal with a variable rate encoder, such as an Enhanced Variable Rate Codec. The method may allow dynamic tradeoff of speech quality and reverse link capacity.

Figure 3:
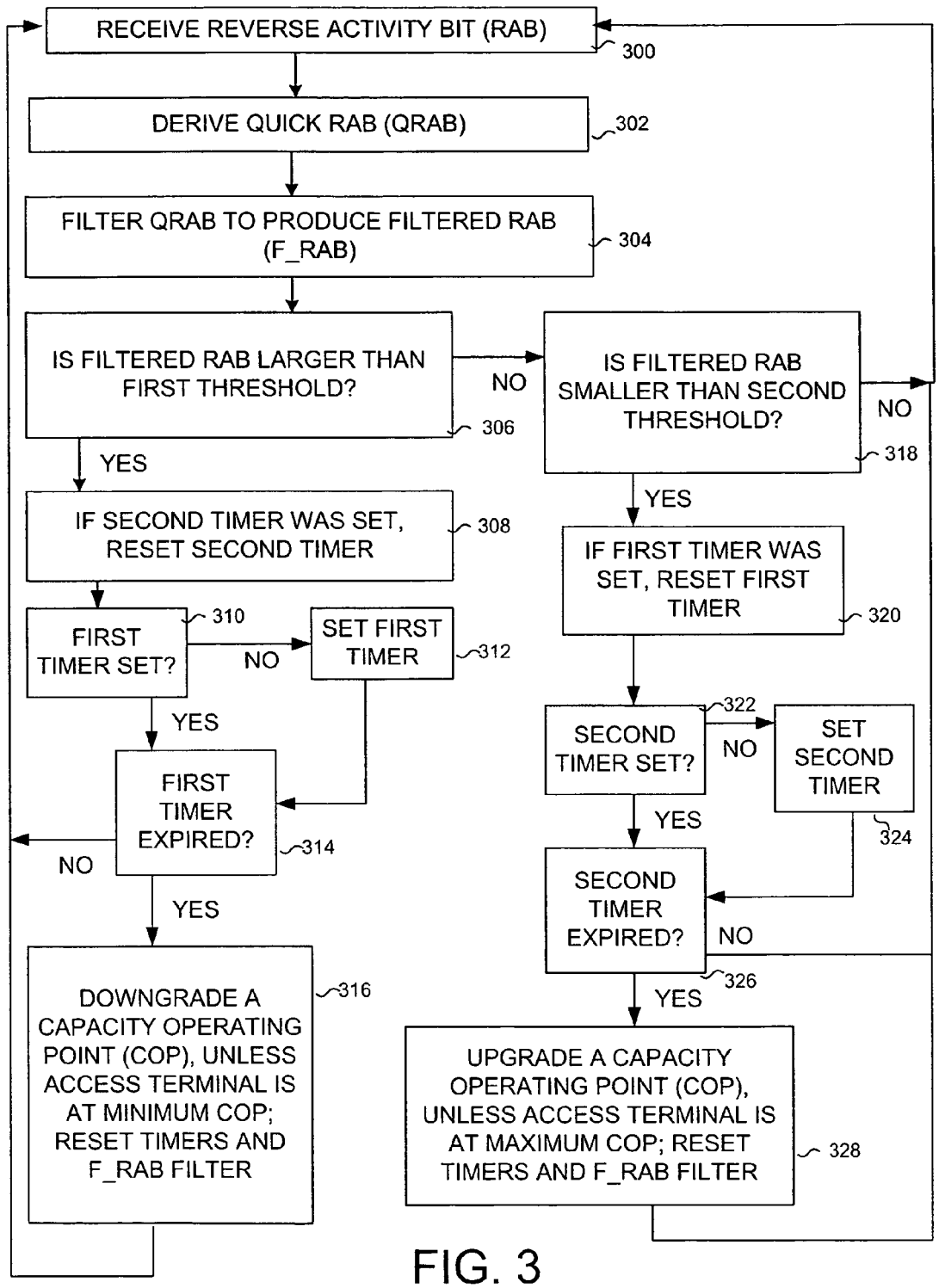
FIG. 3 illustrates a method associated with the system of FIG. 1.

FIG. 3 illustrates a method associated with the system 100 of FIG. 1. The method may be performed by one or more of the components shown in FIGS. 1 and 2. In block 300, the AT 102 receives one or more reverse activity bits (RABs) from two or more base transceiver stations 120A, 120B. A base transceiver station 120 measures system capacity or load of reverse link signals transmitted by one or more ATs and sends a RAB indicating the measured reverse link load to the AT 102. RAB is described in published standards, such as IS-856-A, i.e., CDMA2000 1xEV-DO Rev A.

Other signals that indicate a reverse link capacity or load in other types of communication systems may be used instead of or in addition to a RAB. For example, other types of wireless communication systems may include Wideband CDMA (WCDMA or UMTS), High Speed Downlink Packet Access (HSDPA), High Speed Uplink Packet Access (HSUPA), WiFi 802.11 or WiMAX 802.16 systems.

In block 302, the AT 102 derives a quick RAB (QRAB) based on one or more received RABs. In block 304, the AT 102 filters one or more QRABs to derive a filtered RAB (F_RAB). The filtering is based on an infinite impulse response (IIR) filter:

$$y(n) = (1-1/\tau) \times y(n-1) + (1/\tau) \times x(n)$$

where n denotes a time index in slots or sub-frames, $\tau$ denotes a filter time constant, y denotes the IIR filter output, and x denotes the IIR filter input. The input variable x(n) to this filter is QRAB_n as defined in IS-856-A. FRAB has a specified filter time constant. The method of FIG. 3 may use a different time constant, so a different notation such as F_RAB may be used herein. Note that QRAB_n is independent of the AT's active set, which are a set of one or more base transceiver stations 120A, 120B transmitting signals to the AT 102 above a threshold signal strength. QRAB_n is a merged value across sectors in the active set (each base transceiver station 120 may have multiple sectors). The time constant of this filter should be larger than 1-2 seconds to average out fast variations due to channel variations and bursty traffic.

The AT 102 may dynamically change the COP of its variable rate vocoder 104 as a function of the filtered RAB. The AT 102 may be configured with a set of parameters or variables, such as ReverseLoadUpgradeThreshold and ReverseLoadDownGradeThreshold, and timers, such as TimeToTriggerForDownGrade per COP and TimeToTriggerForUpGrade per COP.

In block 306, if F_RAB y(n) is larger than a first threshold value (ReverseLoadDownGradeThreshold) for a first period of time (TimeToTriggerDownGrade for the current COP), then the AT 102 downgrades the COP in block 316, unless the AT 102 is configured with the minimum COP or is at '111'. The timers and filter are reset in block 316. In block 310, the AT 102 determines whether a first timer (TimeToTriggerDownGrade for the current COP) is set. In block 312, the AT 102 sets the first timer. In block 314, the AT 102 determines whether the first timer (TimeToTriggerDownGrade for the current COP) has expired.

Figure 4:
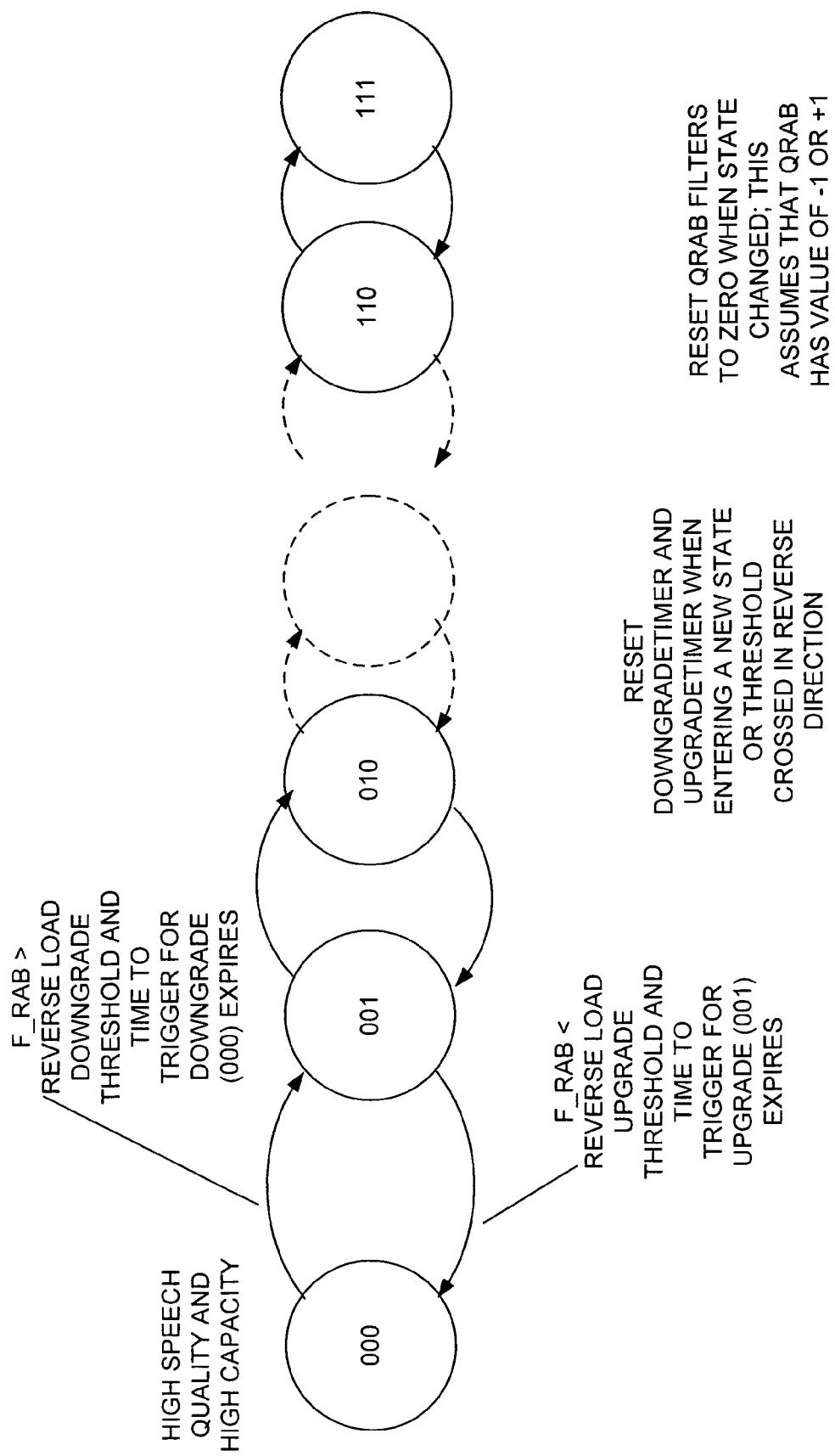
FIG. 4 illustrates a plurality of operating points or states for the access terminal of FIG. 1.

FIG. 4 illustrates a plurality of operating points, e.g., COPs, or states for the access terminal 102 of FIG. 1. As shown in the table above, COP 000 has the highest encoding rate among this set of COPs, and COP 111 has the lowest encoding rate among this set of COPs. In FIG. 4, COP 000 may be a COP with a high speech quality (due to high encoding rate) and use high system capacity. The initial state does not have to be COP 000. Any of the COPs may be an initial state. COP 000 may transition to COP 001 if F_RAB is greater than a reverse load downgrade threshold and time to trigger downgrade per COP 000 expires. COP 001 represents a downgrade with a lower encoding rate (see table above), lower speech quality and uses less system capacity. COP 001 may transition to COP 000 if F_RAB is less than a reverse load upgrade threshold and time to trigger upgrade per COP 001 expires. DownGradeTimer and UpGradeTimer are reset when entering a new state or a threshold crossed in the reverse direction. QRAB filters are reset to zero when the state changes. This assumes that QRAB has value of −1 (unloaded) or +1 (loaded).

In block 318, if F_RAB y(n) is smaller than a second threshold value (ReverseLoadUpgradeGradeThreshold) for second time period (TimeToTriggerUpGrade for current COP), the AT 102 upgrades the COP in block 328, unless the AT 102 is configured with the maximum COP or is at COP '000'. The timers and filter are reset in block 328. In block 322, the AT 102 determines whether a second timer (TimeToTriggerUpGrade for the current COP) is set. In block 324, the AT 102 sets the second timer. In block 326, the AT 102 determines whether the second timer (TimeToTriggerUpGrade for the current COP) has expired.

TimeToTriggerUpGrade and TimeToTriggerDownGrade are timers that start when F_RAB y(n) crosses the ReverseLoadUpgradeGradeThreshold or ReverseLoadDownGradeThreshold, respectively. These timers reset when the thresholds are crossed in the reverse direction (or change of state was executed), as shown in blocks 308 and 320.

The parameters proposed above may regulate hysteresis for mode change. The timers may be a function of the current COP. For example, the time to trigger may be longer for transition to lower quality COPs as the COP state gets downgraded. The time period to trigger from COP 001 to 010 may be longer than the period to trigger from COP 000 to 001. This allows for a slow degradation in quality. On the other hand, the time to trigger thresholds could be set shorter in the direction of recovering from load to allow for quick recovery.

When filtered QRAB_n is close to +1, the reverse link is loaded in the neighborhood of the AT 102. By down grading the COP, the AT 102 transmits at lower activity rate, which results in smaller usage of the reverse capacity at the expense of speech quality. When the system recovers, the AT 102 upgrades the COP and improves speech quality at the expense of capacity.

In other embodiments, more or less than 8 operating points may be used. In another embodiment, a continuous range of operating states may be used instead of a set number of discrete operating points.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various illustrative logical blocks, modules, circuits, and algorithm steps described in connection with the aspects disclosed herein may be implemented as electronic hardware or a combination of electronic hardware and computer software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limitations.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the described aspects may be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An apparatus comprising:
a variable rate vocoder configured to encode speech signals with a plurality of encoding rates, the variable rate vocoder being configured to change from a first encoding rate to a second encoding rate according to a received signal indicating reverse link load; and
a processing unit comprising an infinite impulse response (IIR) filter configured to filter the received signal indicating reverse link load using a time index in slots, a filter time constant, the IIR filter output, and the IIR filter input.

2. The apparatus of claim 1, wherein the processing unit is configured to receive the signal indicating reverse link load and instruct the variable rate vocoder to change from the first encoding rate to the second encoding rate.

3. The apparatus of claim 1, wherein the infinite impulse response (IIR) filter is configured to filter the received signal indicating reverse link load according to:

$$y(n) = (1-1/\tau) \times y(n-1) + (1/\tau) \times x(n)$$

where n denotes the time index in slots, $\tau$ denotes the filter time constant, y denotes the IIR filter output, and x denotes the IIR filter input.

4. The apparatus of claim 1, wherein the first encoding rate is higher than the second encoding rate, the variable rate vocoder being configured to downgrade from the first encoding rate to the second encoding rate when the filtered signal indicating reverse link load is larger than a first threshold value for a first period of time.

5. The apparatus of claim 4, wherein the variable rate vocoder is configured to upgrade from the second encoding rate to the first encoding rate when the filtered signal indicating reverse link load is smaller than a second threshold value for a second period of time.

6. The apparatus of claim 5, wherein the first period of time is associated with the first encoding rate, the first period of time being unequal to the second period of time associated with the second encoding rate.

7. The apparatus of claim 5, wherein the first period of time is associated with downgrading from the first encoding rate to the second encoding rate, the first period of time being shorter than a third period of time associated with downgrading from the second encoding rate.

8. The apparatus of claim 1, wherein the signal indicates a reverse link load in a wireless communication system comprising a plurality of access terminals and at least one base transceiver station, the reverse link referring to signals sent from the access terminals to the base transceiver station.

9. The apparatus of claim 1, wherein the signal indicating reverse link load comprises a reverse activity bit (RAB) in a code division multiple access (CDMA) EV-DO communication system.

10. The apparatus of claim 1 wherein each encoding rate is associated with a capacity operating point.

11. An apparatus comprising:
a variable rate vocoder configured to encode speech signals with a plurality of encoding rates, the variable rate vocoder being configured to change from a first encoding rate associated with a first operating point to a second encoding rate associated with a second operating point according to a filtered signal indicating reverse link load; and
a processing unit comprising an infinite impulse response (IIR) filter configured to filter the received signal indicating reverse link load using a time index in slots, a filter time constant, the IIR filter output, and the IIR filter input.

12. A method comprising:
receiving a signal indicating reverse link load;
processing the signal by a processing unit, wherein the processing comprises an infinite impulse response (IIR) filter filtering the received signal indicating reverse link load using a time index in slots, a filter time constant, the IIR filter output, and the IIR filter input; and
based on the processed signal, changing a speech signal encoding rate from a first encoding rate to a second encoding rate.

13. The method of claim 12, wherein the signal indicates a reverse link load in a wireless communication system comprising a plurality of access terminals and at least one base transceiver station, the reverse link referring to signals sent from the access terminals to the base transceiver station.

14. The method of claim 12, wherein the processing further comprises filtering the received signal indicating reverse link load with the infinite impulse response (IIR) filter according to:

$$y(n)=(1-1/\tau)\times y(n-1)+(1/\tau)\times x(n)$$

where n denotes the time index in slots, τ denotes the filter time constant, y denotes the IIR filter output, and x denotes the IIR filter input.

15. The method of claim 12, wherein the first encoding rate is higher than the second encoding rate, the method comprising downgrading from the first encoding rate to the second encoding rate when a filtered signal indicating reverse link load is larger than a first threshold value for a first period of time.

16. The method of claim 15, further comprising upgrading from the second encoding rate to the first encoding rate when the filtered signal indicating reverse link load is smaller than a second threshold value for a second period of time.

17. The method of claim 15, wherein the first period of time is associated with the first encoding rate, the first period of time being unequal to the second period of time associated with the second encoding rate.

18. The method of claim 15, wherein the first period of time is associated with downgrading from the first encoding rate to the second encoding rate, the first period of time being shorter than a third period of time associated with downgrading from the second encoding rate.

19. The method of claim 12, wherein the signal indicates a reverse link load in a wireless communication system comprising a plurality of access terminals and at least one base transceiver station, the reverse link referring to signals sent from the access terminals to the base transceiver station.

20. The method of claim 12, wherein the signal indicating reverse link load comprises a reverse activity bit (RAB) in a code division multiple access (CDMA) EV-DO communication system.

21. A computer-readable medium encoded with computer executable instructions to be executed by a computer for implementing a method comprising:
receiving a signal indicating reverse link load;
processing the signal, wherein the processing comprises filtering the received signal indicating reverse link load using an infinite impulse response (IIR) filter, a time index in slots, a filter time constant, the IIR filter output, and the IIR filter input; and
based on the processed signal, changing a speech signal encoding rate from a first encoding rate to a second encoding rate.

22. An apparatus, comprising:
means for receiving a signal indicating reverse link load;
means for processing the signal, wherein the processing comprises filtering the received signal indicating reverse link load using an infinite impulse response (IIR) filter, a time index in slots, a filter time constant, the IIR filter output, and the IIR filter input; and
means for changing a speech signal encoding rate from a first encoding rate to a second encoding rate based on the processed signal.

* * * * *